March 17, 1959 R. L. NOLAND 2,878,038
PLASTIC PIPE BEND AND METHOD FOR MAKING SAME
Filed June 27, 1955 2 Sheets-Sheet 1
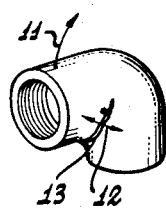
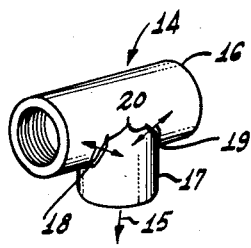
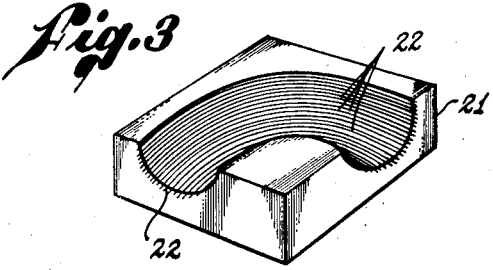
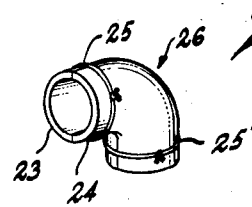
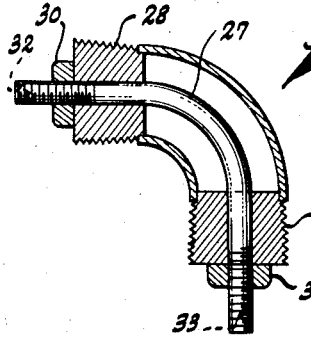
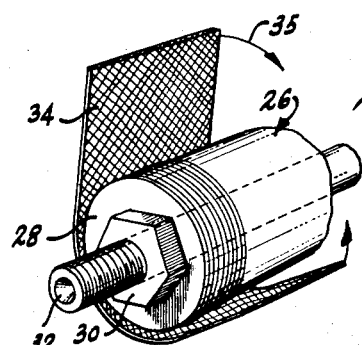
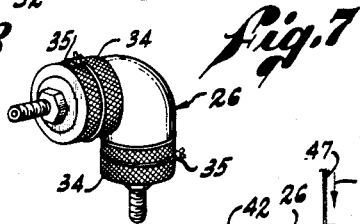
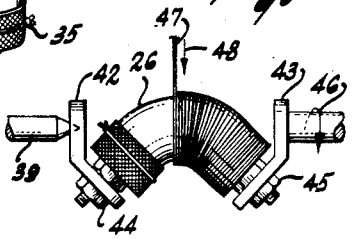
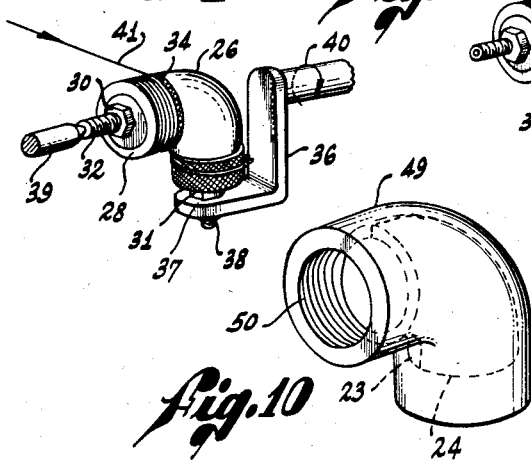
INVENTOR.
ROBERT L. NOLAND
BY Fulwider Mattingly & Huntley
Attorneys March 17, 1959 R. L. NOLAND 2,878,038
PLASTIC PIPE BEND AND METHOD FOR MAKING SAME
Filed June 27, 1955 2 Sheets-Sheet 2
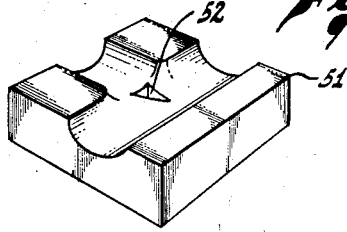
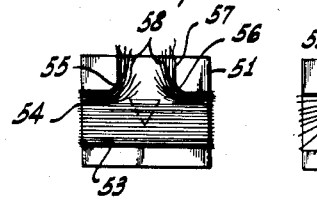
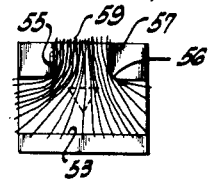
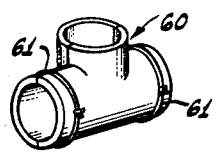
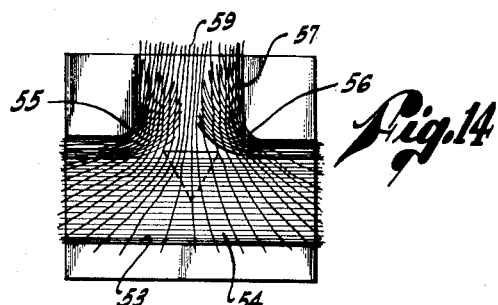
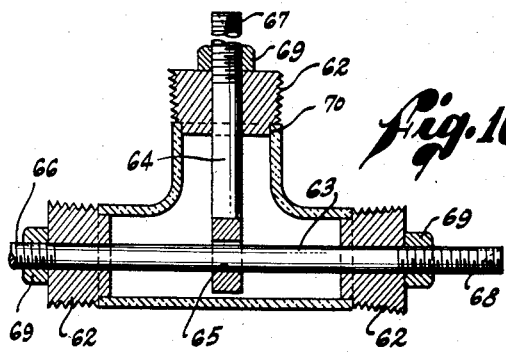
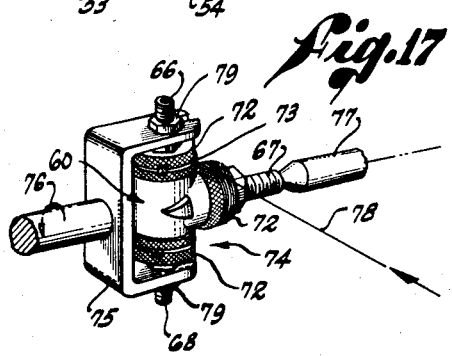
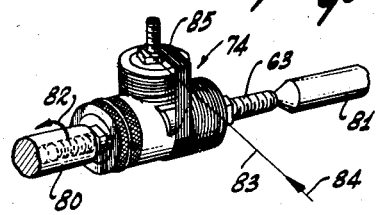
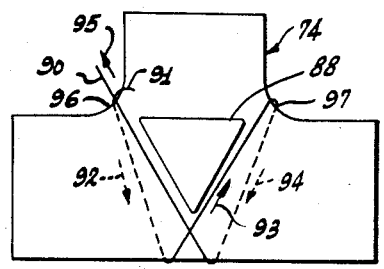
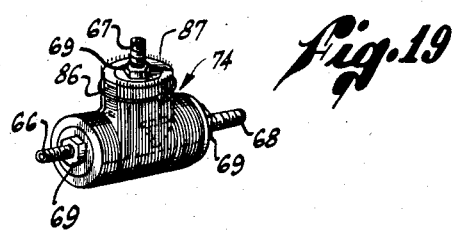
INVENTOR.
ROBERT L. NOLAND
BY *Fulwider Mattingly & Huntley*
Attorneys

United States Patent Office 2,878,038
Patented Mar. 17, 1959

2,878,038

PLASTIC PIPE BEND AND METHOD FOR MAKING SAME

Robert L. Noland, Duarte, Calif., assignor, by mesne assignments, to Reinhold Engineering & Plastics Co., Inc., Marshallton, Del., a corporation of Delaware Application June 27, 1955, Serial No. 518,171

9 Claims. (Cl. 285—55)

This invention relates generally to plastic pipe bends for use at high pressures, and more particularly to pipe bends made of thermo-setting resins reinforced by yarns or fabric disposed within the resin in a novel manner.

This application is a continuation-in-part of copending application Serial No. 465,400 and now abandoned, filed October 28, 1954 by the same inventor. However, whereas the aforementioned parent application relates to pipe couplings generally, the present application is specific to pipe bends. As used in this specification, the term "pipe bend" includes all types of elbows, T's, and crosses, or any other section of pipe or coupling adapted to change the direction of flow of fluids passing therethrough. The term "pipe bend" excludes straight pipes, simple straight couplings, straight pipes of symmetrically changing cross section and straight coupling reducers. A distinguishing characteristic of all pipe bends is the distribution of stress therein when subjected to hydrostatic pressure: whereas straight pipe or tubing of constant or symmetrically changing cross section experiences no stress of relative importance other than longitudinal and hoop stresses, which are uniformly distributed along the pipe, pipe bends experience local concentration of stress, particularly at internal corners. The invention will find its most common applications in 90° elbows and right angle T's; but it can also be used in elbows more or less acute than 90°, side outlet and reducing T's and elbows, laterals which divide a fluid stream or bring two streams together at some angle other than 90°, crosses, or any coupling used for bringing together two or more streams or dividing a stream into two or more branches.

Piping made of glass or certain of the phenolic resin plastics is ideally suited for use under adverse chemical, temperature, or electrolytic conditions, such as those frequently encountered in the chemical industry or in the processing of petroleum and petroleum products. The use of such piping, particularly at high pressures, has been hampered, however, by the inadequacy of available couplings. The logical material for couplings for both glass and plastic piping is thermo-setting resin reinforced by fabric or yarn, particularly Fiberglas fabrics or yarns. Couplings made of this material have not proved satisfactory in the past because of a tendency to change dimensionally (i. e. "creep") and become defective and leaky, after a period of service under high pressure.

It is a major object of this invention to provide strong, light plastic pipe bends highly resistant to creep or other deformation under high internal pressures, and a relatively inexpensive method of manufacturing such pipe bends.

It is a second object to produce pipe bends, including three and four outlet bends, of complex shape without the use of multi-part cores or other expensive tooling for forming the interior surfaces of the pipe bend.

It is a further object to provide pipe bends with smooth internal conduit surfaces and thread surfaces reinforced by fibers adapted to take up the stresses to which said pipe bend is subjected. It is a further object of this invention to provide a fiber reinforced pipe bend in which the fibers are disposed in the direction of stress occurring when the pipe bend is under high internal pressure, and are concentrated approximately proportional to stress concentration in each locality.

It is still another object to provide a method of making pipe bends in which the fibers are slightly pre-stressed and laid along lines of stress occurring within said pipe bend when under high internal pressure.

Other objects of the invention will become apparent in the course of description of the drawings in which:

Figure 1 is a perspective view of a 90° elbow bend with arrows indicating the bending moment and the local concentration of maximum stress under high internal pressure;

Figure 2 is a perspective view of an ordinary 3-way T with arrows showing the two points of maximum local stress concentration and the direction of beam deflection;

Figure 3 is a perspective view of a female die with axially disposed yarns or fibers laid in place preparatory for compression molding of one half of a liner for the interior of an elbow;

Figure 4 shows two mated compression molded halves tied together preparatory for service as a form for the conduit portion of a 90° elbow;

Figure 5 is a longitudinal sectional view of the elbow assembly of Figure 4 showing a mandrel and thread forms mounted therein;

Figure 6 shows the arrangement of fibers in fabric wound on the thread form;

Figure 7 is a perspective view of an elbow liner and mandrel assembly after the thread covering fabric has been wound and tied on the two thread forms;

Figure 8 is a perspective view of a first circumferential winding step;

Figure 9 is a front view of a second circumferential winding step;

Figure 10 is a perspective view of a completed 90° elbow, after baking, showing the compression molded liner in position within the elbow;

Figure 11 is a perspective view of a female die for compression molding half of the liner for a T;

Figure 12 is a plan view of the female die of Figure 11 with one layer of reinforcing yarn shown disposed in position;

Figure 13 is a plan view of the female die of Figure 11 showing another layer of reinforcing fibers or yarns disposed in position for molding;

Figure 14 is a plan view of female die Figure 11 with the fibers of Figures 12 and 13 superimposed on each other, preparatory to compression molding;

Figure 15 is a perspective view of two liner halves assembled in position;

Figure 16 is a sectional view taken in the plane of the axis of the T, and shows the assembly arrangement of thread forms and mandrels;

Figures 17, 18 and 19 are perspective views of different stages of the circumferential winding operations; and Figure 20 is a side view of the T showing the last winding step.

In Figure 1 a 90° elbow is diagrammatically represented. The numeral 11 indicates force exerted on elbow 10 by internal hydrostatic pressure. This force, familiar in physics as the Bourdon tube effect, exerts a turning moment tending to straighten out the elbow. It is accompanied by the concentration of stress at the internal corner indicated by the arrows 12. If the elbow is not sufficiently strong there is a tendency for fracture to occur at the region of stress concentration as indicated by fracture lines 13.

Figure 2 diagrammatically represents a T 14. High internal hydrostatic pressure tends to deflect T 14 in the direction indicated by arrow 15. The straight double-opening pipe section 16 is deflected downward as if its lower wall were a beam weakened in the region of side outlet 17. There is a concentration of stress at the internal corners between the junction of pipe section 16 and side outlet 17 as indicated at 18 and 19 by arrows and by the fracture lines 20.

It is a major feature of this invention that reinforcing fibers are disposed within the plastic pipe to lie approximately along the lines of stress and are concentrated in the density which reaches a maximum in localities of maximum stress concentration. Preferably, fiber orientation and concentration are planned by preliminary stress analysis of the pipe bend. When the direction and magnitude of design stress for each locality of the pipe bend has been determined, the placement and number of fibers in each manufacturing step can be planned so that fibers are laid down in a density which varies throughout the pipe bend approximately in proportion to the concentration of stress, and so that the fibers lay along the lines of stress in each locality.

Although various plastic and fabric materials may be used for the purpose, a preferred material referred to here for purposes of illustration but not of restriction is resin impregnated glass yarn, comprised of many resin coated fibers of Fiberglas. The Fiberglas fibers have great tensile strength which can be utilized to the greatest efficiency in the plastic structure if laid in straight lines and smooth curves in the direction in which tensile stress will occur in the structure during use. Preferably, the yarn should be free of kinks and there should be only a minimum of crossing and twisting. It is desirable to have at least some of the fibers under a slight tension before hardening of the plastic so that the greatest number of fibers can be compacted in a given volume and so that some of the advantages of pre-stressing, analogous to the pre-stressing of reinforcement in concrete, can be had.

The fibers of Fiberglas or other material are most conveniently used in pre-coated condition, that is, with nearly liquid resin in the state of low polymerization, or solvent-thinned so that the fibers are relatively heavy, moldable into shape, and tacky. In this form they are very readily handled and shaped into position. They will retain a contour to which they are formed and may be readily stuck to one another to form a mat or separated for placement in a desired manner.

The glass fibers employed may be any of those fibers or yarns well known in the Fiberglas industry usually being provided in length from about eight to fifteen inches or woven into yarns of greater length. The filaments themselves range in diameters between about one-hundredth of an inch and one-ten-thousandth of an inch.

In the present invention, most of the fiber reinforcing is applied in the form of a single strand of fiber or yarn wound in appropriate position, or arranged in a unidirectional mat without cross-fibers. However, Fiberglas fabrics with both warf and woof strands may also be employed and are preferred for laying down the internal layer of surface reinforcing for the threads.

As pointed out, glass fibers and yarns are coated or impregnated with a resin binder which has been thickened sufficiently to coat the fibers while remaining in an uncured condition. The preferred resins are the thermo-setting resins (which do not tend to flow under stress as do thermoplastic resins). Many such thermo-setting resins are well known in the art of making fiber-reinforced plastic articles. Typical examples of the resins used for this purpose are the furfuryl alcohol resins, unsaturated polyester resins, or mixtures of these or other thermosetting resins with minor percentages of other materials, such as various vinyl compounds, which, as is well known in the art, are useful in producing a resin mix having a desired curing temperature or other curing characteristics.

Although the pipe bends herein described are referred to as plastic, their plastic content is actually smaller than the content of reinforcing fiber, which may comprise as much as 90% by weight of the completed pipe bend. In any event, the fiber content should exceed the resin content and should preferably be at least twice the weight of the resin content. The fibrous material used should have a substantial proportion of similarly oriented continuous threads of substantial tensile strength. Yarn, not twisted so much as to introduce kinks, woven Fiberglas cloth, and Fiberglas mats or felt are satisfactory for the purpose. It should, however, be understood that a great variety of materials such as linen, cotton, or asbestos cloth may be used, depending on the desired application.

The process of making a 90° elbow according to this invention is illustrated in Figures 3–10. In Figure 3, the female half of a compression molding die 21 is seen with axial strands of resin-coated fibers 22 laid in place and uniformly distributed over the half elbow surface. Preferably, the die is pre-coated with silicone oil or other parting agent to permit easy removal of the liner half subsequent to molding. Additional liquid uncured resin may be brushed on the fibers if necessary. Also, the inner corner portion may be strengthened, if design stress requires the concentration there of more fibers than in other parts of the elbow. The male die is then brought to bear, and, with the application of heat and pressure in accordance with any of the well known methods of compression molding, the half elbow is formed. Some grinding may be necessary to remove flashing and minor imperfections, but the resultant molding will be very smooth inside and out and will have a relatively thin uniform wall thickness.

Two such half elbows 23 and 24 are shown assembled in Figure 4 and tied in place by fiber strings 25 and 25'. The assembly thus shown comprises an elbow liner for the unthreaded conduit portion of the final elbow product.

In Figure 5, an elbow mandrel 27 and internal thread forms 28 and 29 have been inserted and fastened in place in the elbow liner assembly of Figure 4 by threading hexagonal nuts 30 and 31 on the threaded ends of elbow mandrel 27. The threaded ends of mandrel 27 project some distance, say an inch or more, from nuts 30 and 31 after the latter have been tightened into place on the elbow liner assembly, so as to serve for the attachment of jigs employed during winding operation described hereinafter. Each end of mandrel 27 is provided with conical holes 32 and 33 which serve as centers on the assembly as later mounted on a winding spindle.

As pointed out in the application Serial No. 465,400, of which this application is a continuation-in-part, circumferential fiber windings alone are not sufficient to provide optimum thread surface and maximum thread strength. To achieve these ends, the process of this invention provides for wrapping the thread forms 28 and 29 with a piece of Fiberglas fabric or felt prior to circumferential winding. It will be understood, of course, that other fabrics might be used for this purpose, and that approximately the same results may be achieved even with individual fibers laid in an axial direction on the thread grooves or obliquely across them. Preferably, the fabric is cut on the bias and wrapped around the thread form with warf and woof strands running diagonally across the thread grooves, forms 28 and 29 having been coated with a parting agent such as silicone oil. The thread surface wrapping should cover about one-third of the elbow and should extend well beyond thread form 28 toward elbow liner assembly 26 so as to serve in the completed product not only as reinforcing for the thread surfaces but as reinforcing material preventing axial rupture between the internally threaded portion of the finished elbow and the smooth conduit portion in which elbow assembbly 26 serves as a liner.

Figure 6 shows the manner in which a piece of fabric 34 is wrapped around thread form 28 (as indicated by arrows 35) to provide suitable thread surface reinforcement.

In Figure 7 an elbow assembly 26 is shown ready for winding. Each of the thread forms 28 and 29 has been wrapped with a piece of fabric 34, which has been tied in place as indicated at 35 by a piece of fiber.

The circumferential winding of fibers around the elbow assembly 26 is carried out in three steps, each of which involves winding about one-third of the elbow. The first and third winding operations are carried out as shown in Figure 8, in which elbow assembly 26 is shown mounted in an L-shaped jig 36. Jig 36 has a hole at 37 adapted to receive the threaded end of mandrel 27 and to be fastened tightly thereon by means of a nut 38. It will be noted that circumferentially winding the elbow produces a greater density of fibers along the arc of the internal corner, where reinforcement is most needed, than along the outer curved wall, or along the straight portions of the elbow. Jig 36 is then mounted in a turning lathe, not shown, and the entire assembly is steadied by introduction of the centering spindle 39 into the center hole 32 in the end of mandrel 27. The elbow assembly 26 and its supporting jig 36 are then rotated by some power means as indicated by the arrow 40 and circumferential winding fiber or yarn is helically fed uniformly across one-third of elbow assembly 26, which includes thread form 28 and its fabric wrapping 34. Thread 41 is kept under slight tension during winding in order to slightly pre-stress it and to force the warf and woof threads of fabric 34 into the thread grooves in a slightly pre-stressed condition.

Circumferential winding of fiber 41 is continued back and forth over one-third of elbow assembly 26, maintaining sufficient tension to closely pack the circumferential winding fibers, until the desired thickness has been laid down. The entire assembly is then removed from the lathe, jig 36 is unbolted from the end of mandrel 27 and, as seen in Figure 9 two 45° jig fixtures 42 and 43 are assembled with elbow liner assembly 26, jig 42 being attached by nut 44 to one end of mandrel 27 and jig 43 being slipped over and tightened on the other end of mandrel 27 by bolt 45. The assembly is then mounted in the winding lathe as shown in the figure with power rotation applied as indicated by the arrow 46, jig 42 being free to rotate on centering spindle. The middle third of the elbow assembly 26 is now formed by helically feeding fiber 47 as indicated by the arrow 48 until circumferential fiber winding in the center portion of elbow 26 has been laid down in sufficient amount to provide the desired hoop strength and wall thickness.

After the step illustrated in Figure 9, the remaining third of the elbow, including thread form 29 is wound in exactly the same manner as that shown in connection with the first step in Figure 8.

After completion of the three steps of circumferential winding, additional liquid resin may be brushed on, if desired. The resulting resin-impregnated, fiber-reinforced structure is then cured by baking in an oven for a time and at temperatures appropriate for thermosetting the particular resin used. Preferably, the mandrel is left in the assembly until after curing, in order to avoid any possibility of loosening of the assembbly. After curing, mandrel 27 is removed and thread forms 28 and 29 are unthreaded from the cured elbow.

Figure 10 is a perspective view of the completed elbow 49, with the location of the original compression molded elbow liner halves 23 and 24 seen in their location in the outer shell portion of the finished product.

The sequence of steps in the manufacture of a 90° elbow may be summarized in the following table:

| Step Number | Description of Steps | Illustrative Figure |
| --- | --- | --- |
| 1 | Place axial fibers in die 21 for half of double liner. | Figure 3. |
| 2 | Add resin if necessary, compression mold half elbow liner, and cure. | |
| 3 | Assemble a pair of mating half elbow liners. | Figure 4. |
| 4 | Assemble thread forms and elbow mandrel with the pair of mated elbow liner halves. | Figure 5. |
| 5 | Wind thread surfacing fabric on each of the thread forms. | Figure 6. |
| 6 | Circumferentially wind about one-third of the elbow adjacent an outlet thereof. | Figure 8. |
| 7 | Circumferentially wind the middle portion of the elbow. | Figure 9. |
| 8 | Wind the final third of the elbow as in Figure 8. | Figure 8. |
| 9 | Cure. | |
| 10 | Remove mandrel and unthread thread forms from the elbow. | |
| 11 | Clean-up by trimming or grinding any surface irregularity or imperfections. | |

Figures 11–20 illustrate the manufacture of an ordinary T according to the process of this invention. As in the case of the elbow, the manufacture of the T is carried out in two major steps, the first of which is a compression molding of two T liner halves, which contain most of the reinforcing fibers required for axial strength. This compression molding then serves as a form for the remainder of the T windings, and eliminates the necessity of employing multi-piece or expanding cores.

In Figure 11, a female die 51 for one-half of a T liner is illustrated. Die 51 has a triangular recess 52 at the point of T intersection. This recess is provided for forming a triangular boss on the outer surface of the T liner, which boss is helpful in achieving a compact winding arrangement as will be described hereinafter. The first step in the arrangement of the fibers in molding die 51 is to place a wad of reinforcing fibers in triangular recess 52, to serve as the reinforcement structure for the triangular boss to be formed therein. Fiber density and the direction of fiber lay are not of critical importance in this boss since it is not a location of high stress in the completed T.

After recess 52 has been filled with a wad of fiber, a mat of uni-directional fibers (all lying the same direction and held together by nothing more, preferably, than the tackiness of the resin coating on them) is laid in female die 51 with the fibers arranged lengthwise of the double opening pipe portion 53 of the T die. The width of the mat 54 transverse to its fibers should be at least the distance from the opening of side outlet 57 to the opposite wall of straight pipe portion 53. The extra width of mat 54 is used to multiply the fiber concentration at internal corners 55 and 56 formed by the junction of side outlet 57 with straight pipe portion 53. As viewed in Figure 12 the upper part of the horizontally laid fiber mat 54 is preferably cut at the midpoint as indicated at 58 to permit laying in of the fibers at localities of maximum stress.

The next step is to lay in place in die 51 a second mat of fibers having a length in the direction of the fibers approximately equal to the distance from the mouth of the side outlet 57 to the opposite wall of the straight pipe portion 53, and a width transverse to the fibers about the length of the straight pipe portion 53. This second mat is laid in position on top of mat 54 but in order to show its arrangement more clearly, it is illustrated at 59 in Figure 13 as if mat 54 were not already there. It will be understood, of course, that the fibers would be much denser than it would be possible to illustrate in the drawing; the drawing is made with wide spacing between the fibers so as to diagrammatically represent their disposition and orientation. Since mat 59 is much wider than side outlet 57, fibers are crowded into the die in the vicinity of internal corners 55 and 56, thus concentrating an increased number of fibers in the locality of maximum stress.

The placement of fiber mats 54 and 59 is diagrammatically illustrated in Figure 14. It is impossible to illustrate in a drawing the actual number of fibers, but the drawing of Figure 14 will illustrate the orientation of the two mats with respect to each other and in respect to the half T cavity of die 51. It will be seen that axial stress is well covered in both the straight pipe portion 53 and the side outlet 58 of the T liner, while at the same time, a high concentration of fibers is provided at internal corners 55 and 56 where the greatest concentration of stress is expected to occur in the completed T when it is used under high internal pressure.

If desired, additional uncured resin may now be applied to the fibers as they lay in the die 51. The male die (not shown) is brought into place and a half T is compression molded and cured at temperatures and pressures appropriate to the particular resin and fiber employed. After curing, the T half is separated from the die, and flash and minor defects are ground off.

Figure 15 shows a T liner assembly 60, comprised of two half T's tied together with a few strands of fiber 51. Figure 16 shows the manner in which T liner assembly 60 is assembled with internal thread forms 62 and a two-part mandrel fixture comprised of straight-pipe mandrel 63 and side-outlet mandrel 64. The inner end of the side-outlet mandrel 64 is provided with an eye 65 through which straight-pipe mandrel 63 is passed during assembly. Thread forms 62 are then slipped over the three projecting threaded mandrel ends 66, 67, and 68. Hexagonal nuts 69 are tightened into place, leaving sufficient threaded ends exposed at 66, 67, and 68 to permit the later mounting of jigs for various winding steps.

Thread form 62 is reduced at its inner end 70 so as to provide a shoulder against which the opening of the T liner assembly may seat so that there may be a smooth transition in the interior of the completed T from the smooth conduit portion thereof to the internally threaded opening. The outer mandrel ends 66, 67, and 68 are each provided with center holes for mounting of the entire assembly on a centering spindle during subsequent winding operations.

Each of the thread forms 62 is next wrapped with a piece of thread-reinforcing fabric, matting, or felting, with fibers oriented transversely or obliquely to the thread grooves as described in connection with the wrapping of thread form 28 (see Figure 6) of the elbow previously described. The thread wrappings, seen in Figure 17 at 72 for example, are tied in place with fibers 73 as previously set forth in the description of the steps for manufacturing the elbow. Preferably, thread surfacing fabric 72 is cut on the bias so that warf and woof thread cross the thread grooves diagonally and are tightened into place within the thread grooves by subsequent circumferential windings; also, thread-surfacing fabric 72 should extend beyond thread form 62, partially covering the adjacent part of T liner assembly 60 so as to provide connecting reinforcement fiber between the internally threaded portion and the smooth internal surface portion of the completed T.

The circumferential winding of the side outlet portion of T liner 60, and the thread form 62 seated therein, is shown in Figure 17. The winding assembly, indicated generally by the numeral 74, and comprised of T liner 60 and associated thread forms 62, mandrels 63 and 64, and wrappings 72, is mounted in a U-shaped jig 75 which is power rotated as indicated by the arrows 76. T assembly 74 is steadied and centered by the seating of centering spindle 77 in a center hole in the end 67 of side outlet mandrel 64.

As assembly 74 is power rotated in the direction indicated by the arrow 76, reinforcing fiber 78 is circumferentially wound on the side outlet of assembly 74, being fed tightly over the wrapping 72 until wrapping 72 is tightened against the thread groove surfaces. An adequate wall thickness is built up to a smooth external surface. Density and volume of circumferential winding are made sufficient to sustain the circumferential stresses for which the fitting has been designed.

After completing the circumferential winding of the side outlet portion of winding assembly 74, jig nuts 79 are threaded from mandrel ends 66 and 68 and winding assembly 74 is removed and changed in position for the next circumferential winding step, which is illustrated in Figure 18, in which winding assembly 74 is shown about half way through the circumferential winding of the straight pipe portion of the winding assembly. Straight pipe mandrel 63 is shown mounted between a pair of spindles 80 and 81. Spindle 80 is power rotated in the direction indicated by the arrow 82 so that fiber or yarn 83 can be fed onto the winding assembly 74 as indicated by the arrow 84. Fiber 83 is continuously fed in closely packed winding until the straight pipe portion of assembly 74 is wound from one end to the other, including large laps taken completely around the side outlet portion and over the end thereof as shown at 85. Fiber 83 is then wound back again toward the right hand end of the T as viewed in Figure 18, and winding is repeated backwards and forwards until sufficient circumferential winding has been laid down for reinforcement against design stress, uniform wall thickness, and smooth outer surface.

When the circumferential winding illustrated in Figure 18 has been completed, the fibers on the side outlet portion of the winding T assembly 74 are tied by means of a fiber tie 86 and cut at the periphery of the outer end of thread form 62 as shown at 87, so as to again expose the end of the thread form.

The final winding operation, illustrated in Figure 20 is a criss-cross type of winding which seats in part against the triangular boss 88. In the front elevation of Figure 20, assembly 74 is represented only diagrammatically; mandrel, thread forms and previous winding have been omitted so as to permit a clearer presentation of the final winding step. Reinforcing fiber 90 is started at 91 in this illustrative case although it will be understood, of course, that a variety of equivalent criss-cross windings may be used with the T and boss arrangement shown. The fiber crosses the back of winding assembly 74 as indicated by the arrow 92, then crosses the front of assembly 74 as indicated by the arrow 93. It then recrosses the back as indicated by the arrow 94, passes around the undersurface of assembly 74 and crosses from right to left on the face of assembly 74 as indicated by the arrow 95. This winding operation is repeated until the criss-cross winding around internal corners 96 and 97 of winding assembly 74 has been laid down in sufficient quantity to provide reinforcement against the local stress for which the T has been designed.

The sequence of steps in the manufacture of a T may be summarized by the following table:

| Step Number | Description of Steps | Illustrative Figure |
|---|---|---|
| 1 | Place wad of plastic coated fibers in triangular recess in female die. | Figure 11. |
| 2 | Arrange a first mat of fibers in the die with fibers disposed axially with respect to the double ended pipe portion of the T and extra fibers adjacent the side outlet cut at their centers and arranged around the internal corners of the junction between the side outlet and the straight pipe portion. | Figure 12. |
| 3 | Arrange a second mat of fibers in the die on top of the first mat, the fibers of the second mat being predominantly axial with respect to the side outlet, but concentrated around the internal corners of the junction of the side outlet with the pipe portion. | Figures 13 and 14. |
| 4 | Compression mold a half T liner. | |
| 5 | Assemble a pair of two half T liners in mating position. | Figure 15. |
| 6 | Place a mandrel and thread forming assembly in the assembled T liner of Step No. 6. | Figure 16. |
| 7 | Mount the assembly of Step No. 6 in a winding jig adapted to be power rotated about the axis of the side outlet, and lay down circumferential winding on the side outlet. | Figure 17. |
| 8 | Wrap each of the thread forms with a thread surface reinforcing mat of fibers obliquely transverse to the thread grooves. | |
| 9 | Mount the assembly of Step No. 8, in a winding jig adapted to be rotated about the axis of the straight pipe portion, and circumferentially wind the straight pipe portion. | Figure 18. |
| 10 | Trim away the part of the winding of Step No. 9 which covers the side outlet opening. | Figure 19. |
| 11 | Criss-cross wind fiber around the straight pipe portion of the T in a winding which seats against the triangular boss. | Figure 20. |
| 12 | Cure. | |
| 13 | Remove mandrel and unthread thread forms. | |
| 14 | Remove imperfections or irregularities in surface. | |

Two specific embodiments, a 90° elbow and a standard T, and methods for making them have been described. However, it will be evident from the foregoing description that the same principle can be applied to cross-type couplings, oblique-lateral type couplings, side-outlet elbow and T, etc. The steps will be essentially the same except for variations in die design, mandrel construction, and the arrangement of the fibers, but the differences required will be readily apparent to those skilled in the art after they have reviewed the foregoing parts of this disclosure. In some cases, it will be desired to use a three-part liner for the pipe bend; for example, a side outlet T liner is most conveniently made with the side outlet divided on a plane normal to the plane of the T itself.

The invention is not restricted to a particular resin or fiber, although thermosetting resins which are readily cured at moderately elevated temperatures are preferred, fiberglass is preferred as a reinforcing fiber. The term "resin coated fibers" will be understood to include fibers which are resin coated before winding; yarns which are resin impregnated, i. e. resin is distributed in the interstices between fibers of the yarn; fibers or yarns to which resin is applied only after they have been arranged in their reinforcing position; and fabrics or mats comprised of any of the foregoing.

The invention is not confined to any particular arrangement of liner and the external body containing it; preferably the liner should provide a smooth interior surface at the portion of the pipe bend in which change and direction of flow is to occur, the reason being that this is the portion which would otherwise require core arrangements.

The invention is not restricted as to sequence of the various winding operations, except that the forms for the internal thread grooves should be covered with fibers obliquely or normally transverse to the thread grooves prior to circumferential winding.

Although the method of manufacturing pipe bends according to this invention may be varied in many ways, it is the preferred sequence of operation to form the liner into two halves, rather than in a single part. It is preferred that cores or forms other than the liner be used only for axially straight portions of the completed pipe bend. This makes it possible to use simple forms which may be unthreaded, in the case of internal thread forms, or simply pulled out in the case of axially straight unthreaded portions of the pipe bend.

In the manufacture of the T, a boss was formed on the surface of the liner in order to facilitate winding, and it will be understood that it is a preferred feature of this process to form other types of projection on the external surface of the liner so as to provide locating and anchoring means for fibers to be wound on the liner and other forms assembled with it.

The application of the invention has been illustrated by reference to internally threaded pipe bend couplings, but it will be understood that pipe bends may be made in accordance with the process of the invention, without internal threads, and for other than coupling uses; for example, the invention may be employed for a relatively complex pipe unit, including long straight pipe portions and more than one pipe bend.

I claim:

1. A method of making a pipe bend coupling having internally threaded outlets, which includes the steps of: molding a liner for the interior of said pipe bend portion in two halves, said halves mating at a plane through the pipe bend axis; assembling said mated halves on a mandrel together with internal thread forms at said threaded outlets; laying resin coated fibers on the surface of said liner and internal form assembly, said fibers being oriented along lines of stress and laid down in each locality approximately in proportion to said stress; curing the resin content of said fiber covered assembly; and removing said mandrel and unthreading said thread forms from said pipe bend.

2. A method for making a fiber-reinforced resin impregnated pipe bend coupling with internally threaded outlets, which method includes the steps of: die molding a liner for the unthreaded interior portion of said pipe bend by forming it in two halves mating in the plane of the pipe bend axis said halves incorporating axially disposed fibers; assembling said mating halves into a liner, together with a mandrel and internal thread forms at said threaded outlets; wrapping said internal thread forms with surface reinforcing fibers laid across said thread grooves; winding said assembly of liner and forms with reinforcing fiber material at least a major part of said winding being disposed circumferentially; and curing.

3. A method for making a fiber reinforced plastic elbow coupling with internally threaded outlets, which method includes the steps of: die molding a liner for the unthreaded interior portion of said elbow by forming it in two halves mating in the plane of the elbow axis, with axially disposed fibers reinforcing said liner halves; assembling said mating halves on a mandrel together with internal thread forms at said threaded outlets; wrapping each of said thread forms and adjacent portions of said liner with reinforcing fabric cut on the bias and disposed on said thread forms with warf and woof threads transversely crossing the thread grooves; circumferentially winding said assembly of elbow liner and fabric-covered thread form; curing said assembly; and unthreading said thread forms and removing said mandrel from the cured plastic elbow.

4. A method as described in claim 3 in which the reinforcing fibers in said liner are laid down in substantially greater density in the inner corner portion of said elbow than in the remainder thereof.

5. A method of making a pipe bend having three or more branches, which includes the steps of: molding a liner for the interior of said pipe bend by molding at least two mating parts of said liner with male and female dies, each of said liner parts containing reinforcing fibers laid in the axial direction of each branch thereof, and having a concentration of reinforcing fibers in the regions in which maximum stress in use is anticipated; providing at least one boss projecting from the exterior surface of said molded liner, in the region of an intersection between branches of said pipe bend; assembling said liner with supplemental internal forms and a mandrel arrangement holding them in place; wrapping said assembly with reinforcing fibers laid in reinforcing arrangement to complement the axial fibers contained in the liner; anchoring at least some of said wrapping fibers in place against said boss; curing said pipe bend assembly to harden the uncured resin content thereof to its cured state; and removing the mandrel arrangement and internal forms.

6. A fiber-reinforced plastic pipe bend coupling having internally threaded outlets which includes: a liner for the unthreaded portion of the pipe bend, said liner being comprised of at least two parts mating with each other along an axial line, and said liner containing axial reinforcing fibers; a plastic outer shell enclosing said liner and set in integral combination therewith, which outer shell contains circumferential reinforcing fibers and reinforcing fibers at the thread grooves which fibers are substantially transverse to said grooves.

7. A fiber-reinforced plastic pipe elbow coupling having internally threaded outlets, which includes: a liner comprised of two mating halves mating in a plane through the axis of the elbow, said liner having a smooth internal surface and being reinforced with axially disposed fibers; a shell portion enclosing said two part liner and integrally fused therewith, which shell portion is reinforced by a plurality of circumferential windings; and fibers substantially transverse to said thread grooves in the region of said thread grooves.

8. A fiber-reinforced plastic pipe T coupling, which includes: a liner comprised of two halves mating in the plane through the axis of said T, said liner containing a first mat of reinforcing fibers laid axially in the straight pipe portion of said T, some of said fibers being disposed about the internal corners of the junction of said straight pipe portion with the side outlet portion of said T, and a second mat of reinforcing fibers disposed longitudinally with respect to said side outlet within said side outlet, but diverging within said straight pipe portion toward the outlet of the latter; and a pipe bend shell enclosing said liner and containing circumferentially wound fibers.

9. A pipe T as described in claim 8, in which said liner has bosses projecting from its outer surfaces, and in which some of the fibers in said shell are wound against said bosses.

References Cited in the file of this patent

UNITED STATES PATENTS

| | | |
|---|---|---|
| 1,370,024 | Kempton | Mar. 1, 1921 |
| 1,755,899 | Root | Apr. 22, 1930 |
| 1,942,468 | Andrews | Jan. 9, 1934 |
| 2,070,888 | Eschenbrenner | Feb. 16, 1937 |
| 2,082,611 | Benge | June 1, 1937 |
| 2,374,815 | Haas, Jr. | May 1, 1945 |
| 2,514,597 | Daly | July 11, 1950 |
| 2,519,069 | Roberts | Aug. 15, 1950 |
| 2,718,583 | Noland et al. | Sept. 20, 1955 |
| 2,751,237 | Conley | June 19, 1956 |